(12) United States Patent
Schwartz et al.

(10) Patent No.: US 7,319,513 B2
(45) Date of Patent: Jan. 15, 2008

(54) STABILIZED SOLID STATE GYROLASER WITHOUT BLIND REGION

(75) Inventors: Sylvain Schwartz, Paris (FR); Gilles Feugnet, Les Ulis (FR); Jean-Paul Pocholle, La Norville (FR)

(73) Assignee: Thales, Neuilly-sur-Seine (FR)

( * ) Notice: Subject to any disclaimer, the term of this patent is extended or adjusted under 35 U.S.C. 154(b) by 224 days.

(21) Appl. No.: 10/526,610

(22) Filed: Mar. 16, 2005

(65) Prior Publication Data
US 2006/0176927 A1 Aug. 10, 2006

(30) Foreign Application Priority Data
Mar. 16, 2004 (FR) .................................. 04 02707

(51) Int. Cl.
*G01P 3/36* (2006.01)
*G01C 19/64* (2006.01)
*H01S 3/083* (2006.01)

(52) U.S. Cl. ........................ 356/28.5; 356/28; 356/459; 372/94

(58) Field of Classification Search .................. 356/28, 356/28.5, 459, 472; 372/92–109
See application file for complete search history.

(56) References Cited

U.S. PATENT DOCUMENTS 3,647,303 A 3/1972 Kramer, Jr.
4,222,668 A 9/1980 Henry
4,431,308 A * 2/1984 Mitsuhashi et al. .......... 356/459
4,433,915 A 2/1984 Hanse
4,521,110 A * 6/1985 Roberts et al. ............. 356/459
5,331,403 A * 7/1994 Rosker et al. ............. 356/459
6,034,770 A * 3/2000 Kim et al. .................. 356/459
6,430,206 B1 8/2002 Debuisschert et al.
2002/0176087 A1* 11/2002 Numai ........................ 356/461
2004/0202222 A1 10/2004 Pocholle et al.

FOREIGN PATENT DOCUMENTS

FR 2 465 199 8/1980

\* cited by examiner

*Primary Examiner*—Isam Alsomiri
(74) *Attorney, Agent, or Firm*—Oblon, Spivak, McClelland, Maier & Neustadt, P.C.

(57) ABSTRACT

The invention concerns solid-state gyrolasers used to measure rotation speeds or relative angular positions. This type of equipment is used, in particular, in aeronautical applications.

The purpose of the invention is to complete the optic devices required to control the instability of lasers, using specific optic devices that eliminate the blind region.

In this way, a "fully optic" solid-state laser is obtained, without moving parts, stable, and without blind regions.

These devices comprise in particular reciprocal and nonreciprocal optical rotators, arranged so that two counter-propagating optical modes travel in the cavity at sufficiently different frequencies to avoid mode locking.

6 Claims, 5 Drawing Sheets

STABILIZED SOLID STATE GYROLASER WITHOUT BLIND REGION

BACKGROUND OF THE INVENTION

1. Field of the Invention

The invention concerns solid-state gyrolasers used to measure rotation speeds or relative angular positions. This type of equipment is used, in particular, in aeronautical applications.

Gyrolasers were developed some thirty years ago and are widely sold and used today. Their operation is based on the Sagnac effect, which induces a difference in frequency $\Omega$ between two optical emission modes propagated in opposite directions, called counter-propagating, from a rotating bidirectional ring-shaped laser cavity. Typically, the difference in frequency $\Omega$ is:

$$\Omega = 4A\bar{\omega}/\lambda L$$

where L and A are respectively the cavity length and area; $\lambda$ is the laser emission wavelength excluding the Sagnac effect; $\bar{\omega}$ is the gyrolaser angular rotation speed.

The value of $\Omega$ obtained through spectral analysis of the beat of the two emitted beams serves to obtain the value of $\bar{\omega}$ very accurately.

Electronically counting the beat fringes advancing during a change in angular position gives the relative value of the angular position also extremely accurately.

2. Description of the Prior Art

Manufacturing a gyrolaser requires overcoming a few technical difficulties. The first is linked to the quality of the beat between the two beams, which determines the laser's correct operation. Proper stability and a relative similarity in the intensities emitted in both directions are required for the beat to be correct. But in the case of solid-state lasers, the stability and similarity are not guaranteed due to mode-mode competition, which makes one of the two counter-propagating modes monopolize the available gain, to the detriment of the other mode. The problem of bidirectional emission instability for a solid-state ring-shaped laser may be solved by implementing a counter-reaction loop intended to slave around a set value the difference between the intensities of the two counter-propagating modes. This loop acts on the laser, either by linking its losses to the propagation direction, for instance by means of a reciprocal rotating element, a nonreciprocal rotating element and a polarizing element (patent application No. 03 03645), or by linking its gain to the propagation direction, for instance by means of a reciprocal rotating element, a nonreciprocal rotating element and a polarized emission crystal (patent application No. 03 14598). Once slaved, the laser emits two counter-propagating beams with stable intensities and can be used as a gyrolaser.

A second technical difficulty is linked to low rotation speeds, since gyrolasers only work correctly beyond a given rotation speed. At low rotation speeds, the Sagnac beat signal disappears due to the coupling of the two counter-propagating modes because of the backscattering of the light of the various optical elements present in the cavity. The rotation speed range in which this phenomenon is observed is usually called blind region and corresponds to a typical beat frequency of a few tens of kilohertz. This problem is not intrinsic to the solid state: it is also encountered with gas gyrolasers. The most common solution for this second type of gyrolasers is to activate the device mechanically by giving it a forced and known movement that artificially places it outside the blind region as often as possible.

SUMMARY OF THE INVENTION

The purpose of the invention is to complete the optic devices required to control the instability of solid-state lasers, using specific optic devices that eliminate the blind region. In this way, a "fully optic" solid-state laser is obtained, without moving parts, stable, and without blind regions.

More specifically, the invention concerns a gyrolaser to measure the speed or the angular position according to a set rotation axis, comprising at least:
  a ring-shaped optical cavity;
  a solid-state amplifier medium;
  a slaving device including at least a first optical assembly made up of a first linear polarizer, a first nonreciprocal optical rotator and an optical element, said optical element being either a reciprocal optical rotator or a birefringent element, with at least one of the effects or the birefringence being adjustable;
  and a measuring instrument;

characterized by the fact that the said cavity also comprises:
  a second optical assembly made up successively of a first quarter waveplate, a second nonreciprocal optical rotator and a second quarter waveplate, whose main axes are perpendicular to those of the first quarter waveplate;

such that a first linearly polarized propagation mode can propagate in a first direction in the cavity, and a second propagation mode polarized linearly parallel to the first can propagate in the opposite direction in the cavity, with the main axes of the first quarter waveplate and the second quarter waveplate tilted 45 degree relative to the linear polarization directions of the propagation modes and perpendicular to each other, the optical frequencies of the two modes being different.

Advantageously, the cavity comprises a second linear polarizer whose axis is parallel to that of the first linear polarizer and positioned such that the optical assembly consisting of the first nonreciprocal optical rotator and the optical element are placed between the first and the second polarizer.

The invention concerns a gyrolaser to measure the speed or the angular position according to a set rotation axis, comprising at least:
  a ring-shaped optical cavity;
  a solid-state amplifier medium;
  and a measuring instrument;

characterized by the fact that the said cavity also comprises:
  a slaving device comprising at least a first optical assembly made up of a first linear polarizer and an adjustable nonreciprocal optical rotator;
  a second optical assembly made up successively of a first quarter waveplate, a second nonreciprocal optical rotator and a second quarter waveplate, the axis of the first waveplate being tilted by an angle other than 45 degrees relative to the polarization direction of the linear polarizer, and the axis of the second waveplate being tilted approximately 45 degrees relative to the polarization direction of the linear polarizer;

such that a first propagation mode can propagate in a first direction in the cavity, and a second propagation mode can propagate in the opposite direction in the cavity, the optical frequencies of both modes being different.

Advantageously, a system to measure the speeds or relative angular positions along three different axes, can comprise three gyrolasers according to the invention, oriented in different directions and mounted on a common mechanical structure.

BRIEF DESCRIPTION OF THE DRAWINGS

The invention shall be better understood and other advantages revealed by reading the non-restrictive description below and the appended figures, among which.

MORE DETAILED DESCRIPTION

The specific devices according to the invention must fulfill two specific functions:
  slave the intensity of the counter-propagating modes;
  eliminate the blind region.

To fulfill these functions, the device generates inside the cavity two optical modes at different frequencies. The first propagation mode rotates in the cavity in a first propagation direction. The second mode rotates in the opposite propagation direction.

Figure 1:
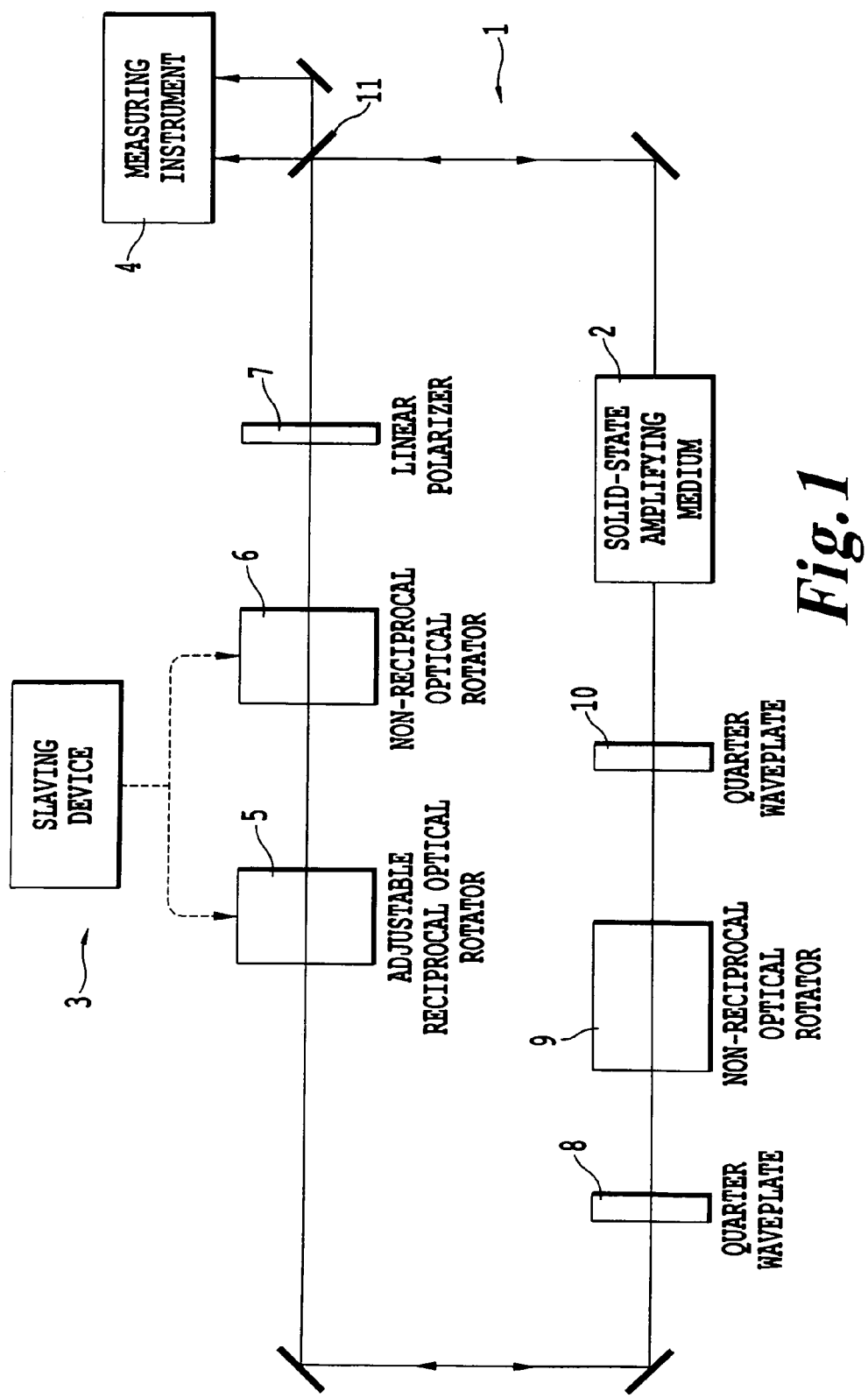
FIG. 1 is an overview of the gyrolaser according to the invention.

The frequency difference and the intensity slaving of these two modes are obtained with the gyrolaser according to the invention as shown in FIG. 1. It mainly comprises:
  a ring-shaped optical cavity 1;
  a solid-state amplifying medium 2;
  a measuring instrument 4;
  a slaving device 3 including at least a first optical assembly made up of a first linear polarizer 7, a first nonreciprocal optical rotator 6 and an optical element, which in this case is a reciprocal optical rotator 5 at least one of whose effects is adjustable, the setting control of the rotator effects is shown on FIG. 1 by dotted arrows;
  a second optical assembly made up successively of a first quarter waveplate 8, a second nonreciprocal optical rotator 9 and a second quarter waveplate 10, whose main axes are perpendicular to those of the first quarter waveplate;

such that a first linearly polarized propagation mode can propagate in a first direction in the cavity, and a second propagation mode polarized linearly parallel to the first can propagate in the opposite direction in the cavity, with the main axes of the first quarter waveplate and the second quarter waveplate tilted 45 degree relative to the linear polarization directions of the propagation modes and approximately perpendicular to each other, the optical frequencies of the two modes being different.

Figure 3:
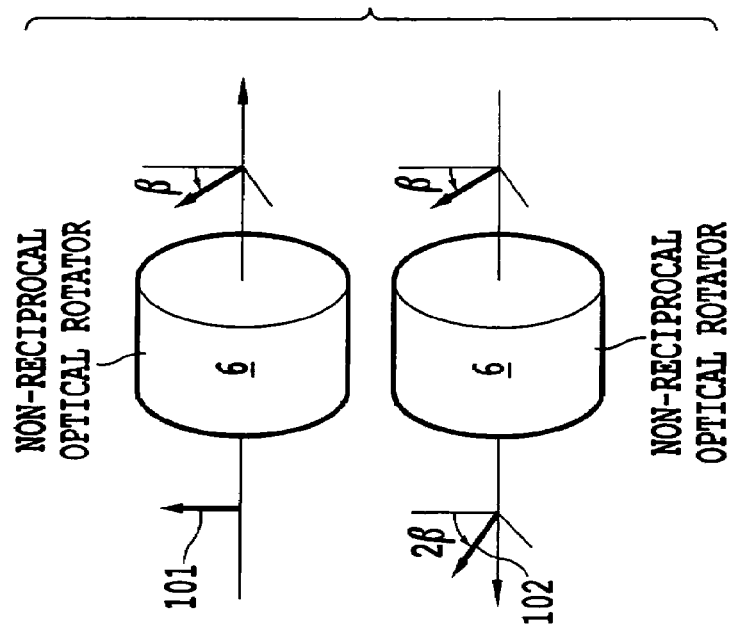
FIG. 3 shows the operating principle of a nonreciprocal optical rotator.

The first optical assembly comprises a reciprocal optical rotator 5 and a nonreciprocal optical rotator 6. An optical rotation of a wave's polarization is said to be nonreciprocal when the effects of the polarization's rotation add up after the wave is reflected (goes and returns) in an optical component with this property. The optical component is called nonreciprocal optical rotator. For example, material with the Faraday effect is material that when subjected to a magnetic field rotates the polarization plane of beams passing through it. This effect is not reciprocal. Thus, the same beam traveling in the opposite direction will have its polarization plane rotated in the same direction. This principle is illustrated in FIG. 3. The propagation directions are shown by horizontal arrows. The polarization direction of the linearly polarized beam 101 is rotated by an angle $\beta$ when it passes through component 6 with Faraday effect in the direct sense (top diagram of FIG. 3). If we reinject in the component with Faraday effect an identical beam 102 propagating in the opposite direction and whose polarization direction is initially rotated by $\beta$, its polarization direction rotates again by $\beta$ in passing through the component, the total rotation angle being $2\beta$ after a reflection (lower diagram of FIG. 3).

Figure 2:
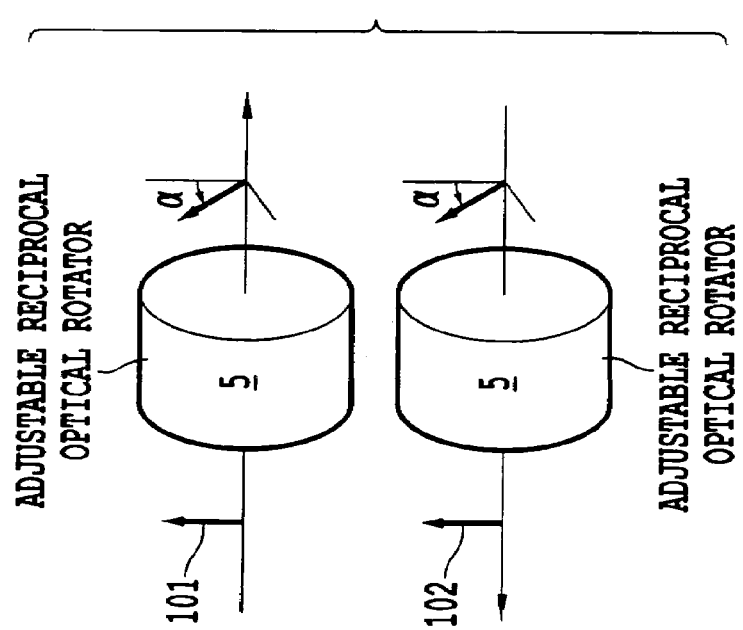
FIG. 2 shows the operating principle of a reciprocal optical rotator.

In a traditional reciprocal rotator 5, the polarization direction of beam 101 rotates by $+\alpha$ in the direct sense and the polarization direction of beam 102 rotates by $-\alpha$ in the opposite propagation direction, so that the initial polarization direction is obtained, as shown on the diagrams in FIG. 2.

Figure 4:
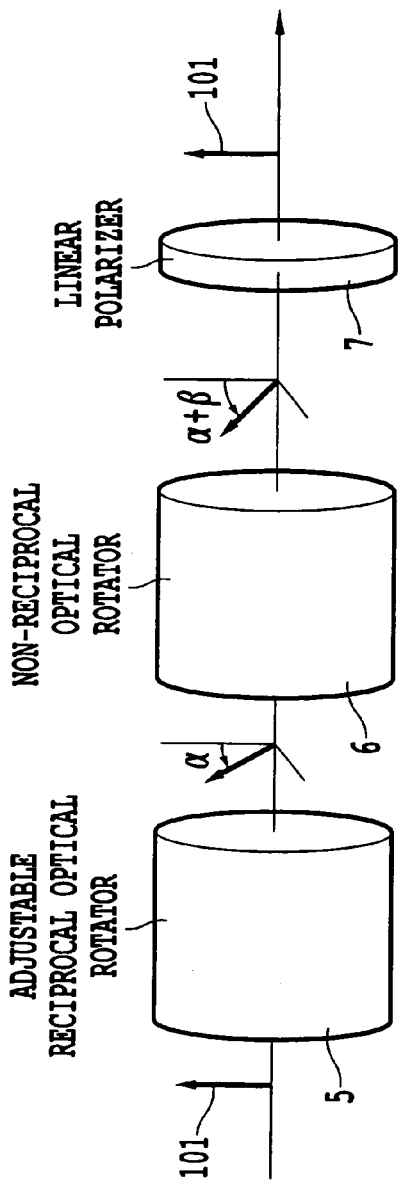
FIG. 4 shows the operating principle of the combination of a polarizer, a reciprocal optical rotator and a nonreciprocal optical rotator.

The first optical assembly's operation is shown on FIG. 4.

In the type of cavity according to the invention, the natural states of the counter-propagating modes are linearly polarized along an axis parallel to the polarizer axis 7. In the direct sense, the first optical mode 101 first passes through the reciprocal rotator 5, then through the first nonreciprocal rotator 6 and finally through polarizer 7. Consequently, its polarization direction rotates by an angle $\alpha$ after passing through the first element, and by an angle $\alpha+\beta$ after passing through the second element. In passing through polarizer 7, the mode has therefore been damped by a factor $\cos^2(\alpha+\beta)$. In the opposite direction, the second optical mode shall also be damped by polarizer 7 after doing a full turn. It can be proved that this second factor is $\cos^2(\alpha-\beta)$. Consequently, the modes are damped differently according to their propagation direction and the damping depends directly on the importance of the effects the polarization of the two modes has experienced. Thus it is possible to vary the intensities of the counter-propagating modes by varying at least one of the two values $\alpha$ or $\beta$ by the effects experienced by the polarizations of two modes through the slaving device. Thus the intensity of the various modes is slaved around a constant value.

Figure 5:
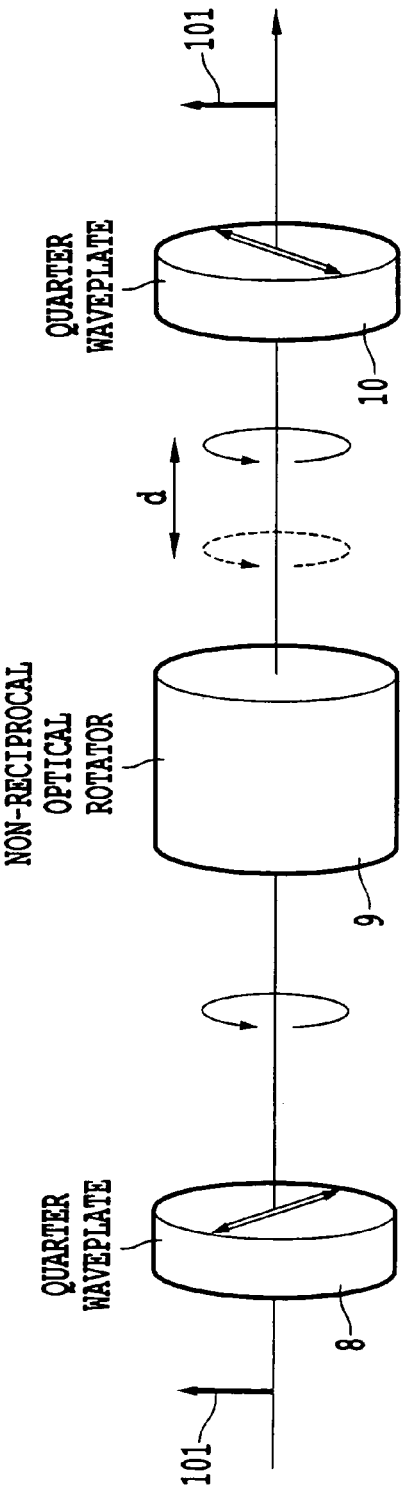
FIG. 5 shows the operating principle of an assembly made up of a first quarter waveplate, a second nonreciprocal optical rotator and a second quarter waveplate.

The operation of the second optical assembly is shown on FIG. 5. When a linearly polarized optical mode 101 (right arrow on FIG. 5) passes through the first quarter waveplate 8, if the main axis of this retardation plate, represented by a double arrow, is tilted 45 degrees relative to the polarization direction, then the mode polarization exits with a right circular polarization (full semi-circular arrow on FIG. 5).

This circular polarized wave is subjected to a nonreciprocal phase difference d when it passes through the second optical nonreciprocal rotator 9. It is then transformed again into a linearly polarized wave by the second quarter waveplate 10 whose main axis is perpendicular to the main axis of the first quarter waveplate. Thus a nonreciprocal phase difference is introduced in the mode passing through this fourth optical assembly, while preserving the wave's linear polarization.

Using the above devices, it is therefore possible to generate inside the cavity two modes traveling in opposite directions, to attenuate them variably in a controlled manner to keep them at the same level of intensity and also to introduce reciprocal and nonreciprocal phase differences on these modes. To determine the natural modes and their frequencies, the Jones matrices formalism is used. In the general case, this consists in representing the influence of a component on an optical propagation mode via a 2×2 matrix referenced to a plane perpendicular to the propagation direction of the optical modes.

To obtain the resulting influence of all intra-cavity components, we merely determine the natural states of the product of the various matrices representative of these components. This product is not necessarily commutative, so the matrix may change according to the beam propagation direction.

The matrices of the various optical elements present in the cavity are as follows:

For a reciprocal rotator crossed in a first rotation direction called direct sense, the matrix $R_+(\alpha)$ is:

$$R_+(\alpha) = \begin{pmatrix} \cos(\alpha) & -\sin(\alpha) \\ \sin(\alpha) & \cos(\alpha) \end{pmatrix}$$

For a reciprocal rotator crossed in a second rotation direction called opposite sense, the matrix $R_-(\alpha)$ is:

$$R_+(\alpha) = \begin{pmatrix} \cos(\alpha) & \sin(\alpha) \\ -\sin(\alpha) & \cos(\alpha) \end{pmatrix}$$

For a nonreciprocal rotator, the matrix $F(\beta)$ is independent of the propagation direction and is:

$$F(\beta) = \begin{pmatrix} \cos(\beta) & -\sin(\beta) \\ \sin(\beta) & \cos(\beta) \end{pmatrix}$$

For a polarizer, the matrix P is:

$$P = \begin{pmatrix} 1 & 0 \\ 0 & 0 \end{pmatrix}$$

For a quarter waveplate rotated 45 degrees, the matrix is $L_1$ is:

$$L_1 = \frac{1}{\sqrt{2}} \begin{pmatrix} 1 & -i \\ -i & 1 \end{pmatrix}$$

For a quarter waveplate rotated 135 degrees, the matrix $L_2$ is:

$$L_2 = \frac{1}{\sqrt{2}} \begin{pmatrix} 1 & i \\ i & 1 \end{pmatrix}$$

The matrices $M_+$ and $M_-$ representative of all optical devices present in the cavity for modes propagating in the direct sense and in the opposite direction can be obtained by simple multiplication:

$$M_+ = P \cdot R_+(\alpha) \cdot F(\beta) \cdot L_1 \cdot F(d) \cdot L_2$$

And $$M_- = L_2 \cdot F(d) \cdot L_1 \cdot F(\beta) \cdot R_-(\alpha) \cdot P$$

i.e.

$$M_+ = \begin{pmatrix} \cos(\alpha+\beta)e^{-id} & -\sin(\alpha+\beta)e^{id} \\ 0 & 0 \end{pmatrix}$$

and $$M_- = \begin{pmatrix} \cos(\alpha-\beta)e^{id} & 0 \\ -\sin(\alpha-\beta)e^{-id} & 0 \end{pmatrix}$$

Knowing matrices $M_+$ and $M_-$ helps determine the natural states of the optical modes that may propagate in the cavity. There is a natural states with a natural non-null value in each propagation direction, noted (+) and (−):

The modulus of (+) and (−) differs with the propagation direction, so it is possible to slave the counter-propagating modes at a constant intensity by varying one of the two coefficients $\alpha$ or $\beta$.

If the gyrolaser does not rotate, the frequency $\nu$ of an optical mode in a ring-shaped laser cavity with length L is typically linked to the phase difference $\phi$ which this mode undergoes after each turn round the cavity by the relationship:

$$\nu = \frac{c}{L}\left(n - \frac{\varphi}{2\pi}\right)$$

where n is an integer and c the speed of light

The two modes are offset by an angle 2d, so the difference in frequency $\Delta\nu$ existing between the modes is:

$$\Delta\nu = \frac{d \cdot c}{2\pi L}$$

Consequently, if this difference is sufficiently big, the coupling of the two modes (+) and (−) does not take place. The choice of the value of $\Delta\nu$ is set by the desired gyrolaser operating range. To guarantee this condition, simply dimension appropriately the optical and geometrical parameters of the nonreciprocal rotators.

When the cavity is rotating, the natural frequencies are offset by the Sagnac effect by a frequency of $\pm\Omega/2$, the sign depending on the mode propagation direction. The difference in frequencies is in this case $\Delta\nu_s$:

$$\Delta\nu_s = \frac{d \cdot c}{2\pi L} + \Omega$$

Knowing $\Delta\nu$, which only depends on known parameters, and $\Delta\nu_s$ which is measured, we obtain the beat frequency $\Omega$ to determine the angular rotation speed. Electronically counting the beat fringes advancing during a change in angular position gives the relative value of the angular position also extremely accurately.

The different operations to determine the frequency difference $\Delta v_s$ are performed with the measuring instrument, which comprises
- optical devices to make on the one hand the first propagation mode interfere with the second;
- opto-electronic devices to determine the optical frequency difference $\Delta v_s$ between the first propagation mode and the second propagation mode.
- electronic devices to obtain the beat frequency difference $\Omega$ or counting the beat signal fringes.

Figure 6:
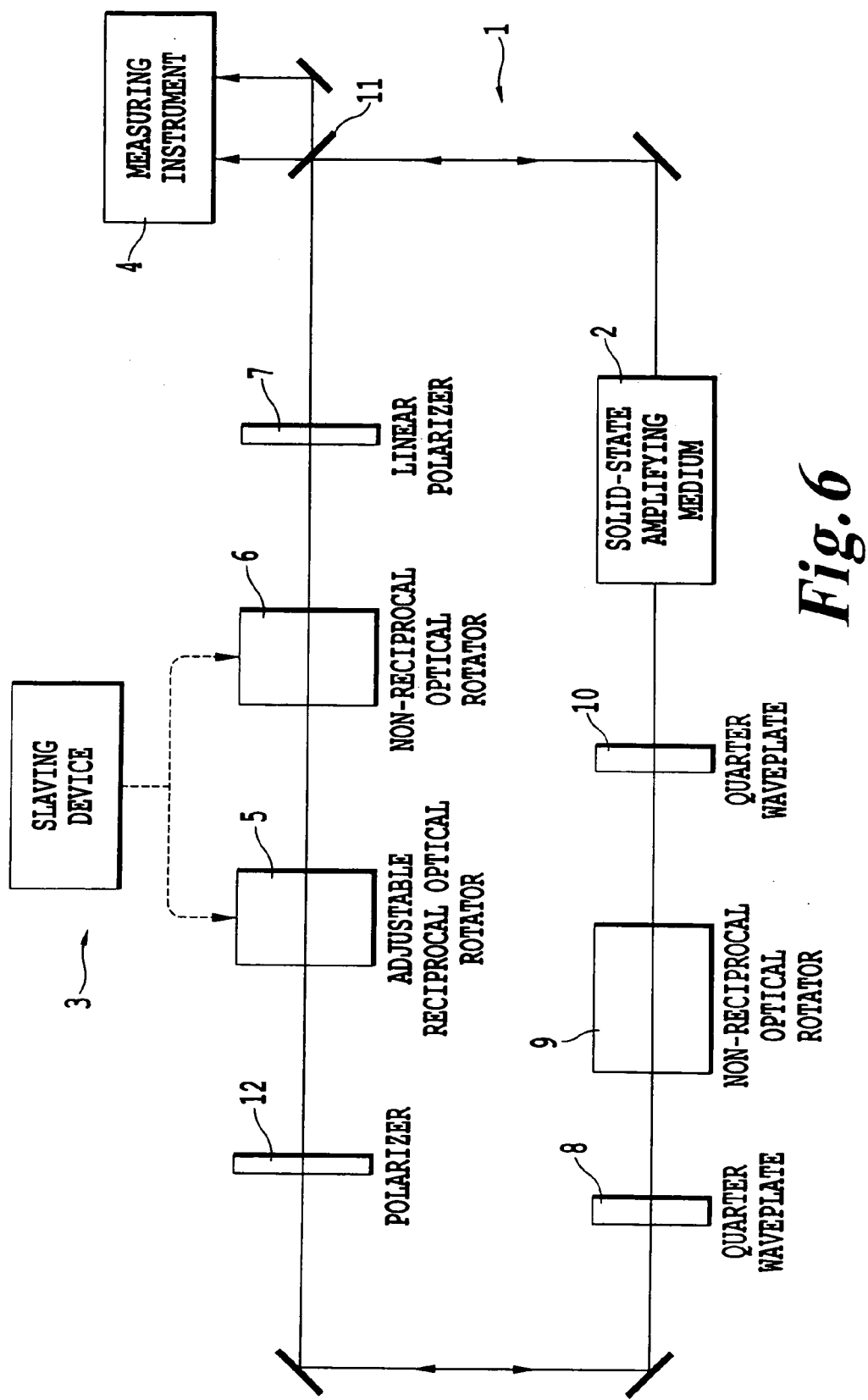
FIG. 6 shows the operation of a first variant of a gyrolaser according to the invention.

The optical axes of the quarter waveplates may not be perfectly aligned. In this case, the frequency difference between the counter-propagating modes comprises spurious terms linked to the nonreciprocal effects which may alter the measurement. A simple way to solve this problem is shown on FIG. 6. The cavity comprises a second polarizer 12 whose axis is parallel to that of the first polarizer. Thus the optical assembly made up of a first nonreciprocal optical rotator and the optical element are positioned between the first and the second polarizer.

In this case, when the axes of the quarter waveplates are perfectly aligned at 45 degrees of the polarizer axes, the Jones matrices of this new configuration are written, using the same notation as above:

$$M_+ = P.R_+(\alpha).F(\beta).P.L_1.F(d).L_2$$

And $M_- = L_2.F(d).L_1.P.F(\beta).R_-(\alpha).P$ i.e.

$$M_+ = \begin{pmatrix} \cos(\alpha+\beta)e^{-id} & 0 \\ 0 & 0 \end{pmatrix}$$

and $$M_- = \begin{pmatrix} \cos(\alpha-\beta)e^{id} & 0 \\ 0 & 0 \end{pmatrix}$$

Evidently, the propagation modes have the same frequencies and the same modulus as before.

When the quarter waveplate axes are no longer perfectly aligned, $\phi$ is the angle between the axis of the first waveplate and that of the polarizers:

$\phi = \pi/4 + \theta$, $\theta$ being the misalignment angle

It can then be shown that the Jones matrix $L_3(\phi)$ associated to such a quarter waveplate is:

$$L_3(\phi) = \frac{1}{\sqrt{2}} \begin{pmatrix} 1+i-2i\cos^2(\phi) & -2i\cos(\phi)\sin(\phi) \\ -2i\cos(\phi)\sin(\phi) & 1+i-2i\sin^2(\phi) \end{pmatrix}$$

In this case, the Jones matrices are:

$$M_+ = P.R_+(\alpha).F(\beta).P.L_1.F(d).L_3(\phi)$$

And $M_- = L_3(\phi).F(d).L_1.P.F(\beta).R_-(\alpha).P$ i.e.

$$M_+ = \begin{pmatrix} \cos(\theta)e^{-i\theta}\cos(\alpha+\beta)e^{-id} & \sin(\theta)e^{-i\theta}\cos(\alpha+\beta)e^{-id} \\ 0 & 0 \end{pmatrix}$$

and $$M_- = \begin{pmatrix} \cos(\theta)e^{-i\theta}\cos(\alpha-\beta)e^{id} & 0 \\ \sin(\theta)e^{-i\theta}\cos(\alpha-\beta)e^{id} & 0 \end{pmatrix}$$

As can be seen, the misalignment introduces an additional phase-shift. However, this phase-shift is identical on both counter-propagating modes, it has no effect on the relative phase difference between the two counter-propagating modes, which remains equal to d. The misalignment also introduces additional losses. Nevertheless, if the misalignment angle $\phi$ is small, these losses have no consequence on the mode slaving.

Consequently, introducing a second polarizer 12 in the cavity eliminates the spurious effects caused by the misalignment of the quarter waveplates, making the intensity control device and the bias introduced by the phase-shifter completely independent.

Figure 7:
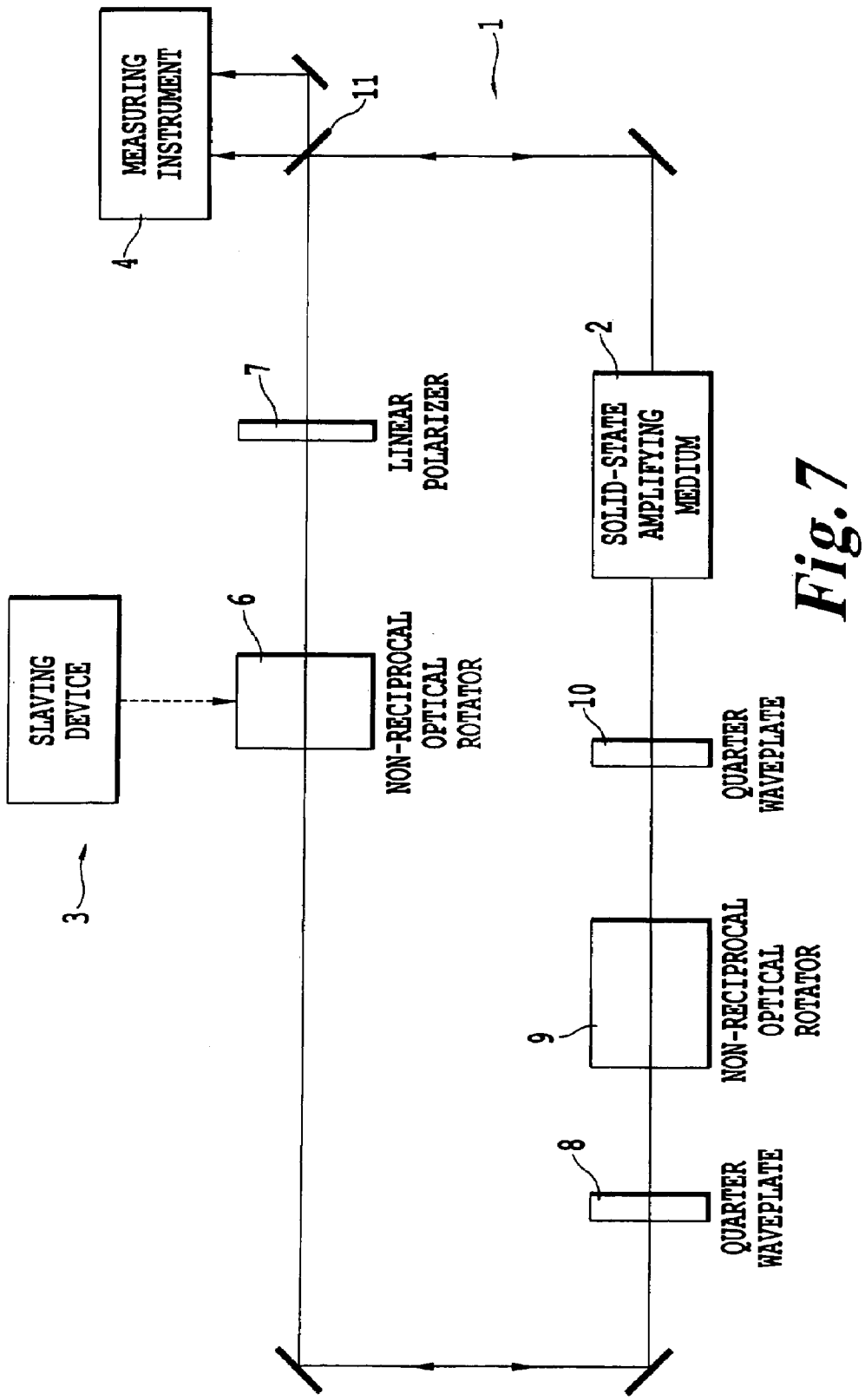
FIG. 7 shows the operation of a second variant of a gyrolaser according to the invention.

The quarter waveplates are reciprocal optical components. Consequently, it is possible to create, as shown in FIG. 7, a cavity containing a slaving device which at least comprises:
- a first optical assembly made up of a first linear polarizer 7 and an adjustable nonreciprocal optical rotator 6, the reciprocal rotator no longer being required in this configuration;
- a second optical assembly made up successively of a first quarter waveplate 8, a second nonreciprocal optical rotator 9 and a second quarter waveplate 10, with the axis of the first waveplate 8 being tilted by an angle $\phi$ relative to the polarization direction of the linear polarizer, with:

$\phi = \pi/4 + \theta$, $\theta$ being different from 0, the axis of the second waveplate 10 being tilted approximately 45 degrees relative to the linear polarizer polarization direction and approximately 90 degrees relative to the axis of the first waveplate 8.

The Jones matrix $L_3(\phi)$ associated with the first waveplate is known. The Jones matrices of this configuration are written, using the same notation as above:

$$M_+ = F(\beta).L_3(\phi).F(d).L_2.P$$

And $M_- = P.L_2.F(d).L_3(\phi).F(\beta)$

It can be shown that the first matrix can have the natural value:

$$\lambda_+ = \cos(\beta+\theta)e^{i(\theta+d)}$$

and that the second matrix can have the natural value:

$$\lambda_- = \cos(\beta-\theta)e^{i(\theta-d)}$$

Consequently, with this optical arrangement, the mode intensity modulation and the phase-shifting differ according to the mode's propagation direction. The same effect is indeed obtained as for the first embodiment with one optical component less.

In these two embodiments, the nonreciprocal rotator may be a Faraday rotator consisting of a bar of a material such as TGG (acronym of Terbium Gadolinium Garnet) or YAG (acronym of Yttrium Aluminum Garnet). The bar is placed in the magnetic field of a magnet to obtain a constant nonreciprocal effect, or of a solenoid in order to obtain a variable effect controlled by the slaving system. Advantageously, for a constant bias, the material may be used to saturation to restrict fluctuations.

The reciprocal rotator may be an optically active element. It may also be replaced by a waveplate or a second polarizing optical element. It may also be obtained by means of a non-planar cavity with a special arrangement of the mirrors in the cavity such that the optical beams do not propagate within a plane. The rotator's effect may be either constant or variable, in which case it is controlled by the slaving system (patent application No. 03 03645).

It is of course possible to assemble several gyrolasers according to the invention to create an angular speed or relative angular position measurement system along three different axes, comprising, for instance, three gyrolasers mounted on a common mechanical structure.

What is claimed is:

1. Gyrolaser to measure the angular speed or the relative angular position according to a set rotation axis, comprising at least:
    a solid-state amplifying medium;
    a slaving device including at least a first optical assembly made up of a first linear polarizer, a first nonreciprocal optical rotator and an optical element, said optical element being either a reciprocal optical rotator or a birefringent element, with at least one of the effects of the birefringence being adjustable;
    a measuring instrument;
    a ring-shaped optical cavity comprising a second optical assembly made up successively of a first quarter waveplate, a second nonreciprocal optical rotator and a second quarter waveplate, whose main axes and perpendicular to those of the first quarter waveplate;
    such that a first linearly polarized propagation mode can propagate in a first direction in the cavity, and a second propagation mode polarized linearly parallel to the first can propagate in the opposite direction in the cavity, with the main axes of the first quarter waveplate and the second quarter waveplate tilted 45 degree relative to the linear polarization directions of the propagation modes, the optical frequencies of the two modes being different.

2. Gyrolaser according to claim 1, wherein the cavity comprises a second linear polarizer whose axis is parallel to that of the first linear polarizer and positioned such that the optical assembly consisting of the first nonreciprocal optical rotator and the optical element are placed between the first and the second polarizer.

3. System to measure the angular speeds or relative angular positions along three different axes, comprising three gyrolasers according to claim 2, oriented in different directions and mounted on a common mechanical structure.

4. System to measure the angular speeds or relative angular positions along three different axes, comprising three gyrolasers according to claim 1, oriented in different directions and mounted on a common mechanical structure.

5. Gyrolaser to measure the angular speed according to a set rotation axis, comprising at least:
    a solid-state amplifying medium;
    a measuring instrument;
    a ring-shaped optical cavity comprising:
        a slaving device comprising at least a first optical assembly made up of a first linear polarizer and an adjustable nonreciprocal optical rotator;
        a second optical assembly made up successively of a first quarter waveplate, a second nonreciprocal optical rotator and a second quarter waveplace, the axis of the first waveplate being tilted by an angle other than 45 degrees relative to the polarization direction of the linear polarizer, and the axis of the second waveplate being tilted approximately 45 degrees relative to the polarization direction of the linear polarizer;
    such that a first propagation mode can propagate in a first direction in the cavity, and a second propagation mode can propagate in the opposite direction in the cavity, the optical frequencies of both modes being different.

6. System to measure the angular speeds or relative angular positions along three different axes, comprising three gyrolasers according to claim 5, oriented in different directions and mounted on a common mechanical structure.

* * * * *

UNITED STATES PATENT AND TRADEMARK OFFICE
CERTIFICATE OF CORRECTION

| | |
|---|---|
| PATENT NO. | : 7,319,513 B2 |
| APPLICATION NO. | : 10/526610 |
| DATED | : January 15, 2008 |
| INVENTOR(S) | : Sylvain Schwartz et al. |

It is certified that error appears in the above-identified patent and that said Letters Patent is hereby corrected as shown below:

Title Page, Item (45) Date of Patent should read: --Jan. 15, 2008--

(*) Notice should read:  --Subject to any disclaimer, the term of this Patent is extended or adjusted under 35 U.S.C. 154(b) by 224 days.

This patent is subject to a terminal disclaimer.--

Signed and Sealed this

Sixth Day of May, 2008

JON W. DUDAS
*Director of the United States Patent and Trademark Office*